July 19, 1960  F. G. BURG  2,945,402
MOVABLE MOUNTING FOR MACHINE TOOL
Filed Nov. 4, 1957  4 Sheets-Sheet 3
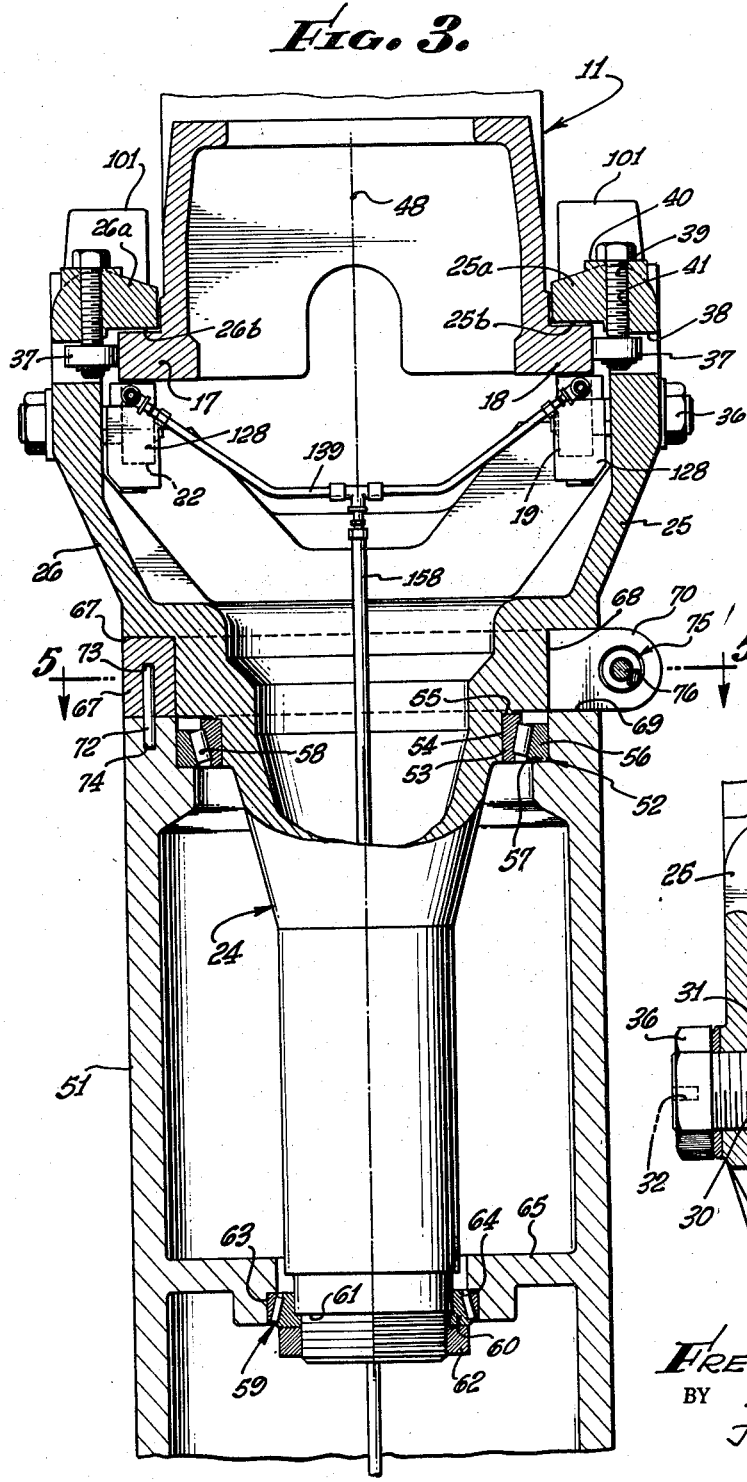
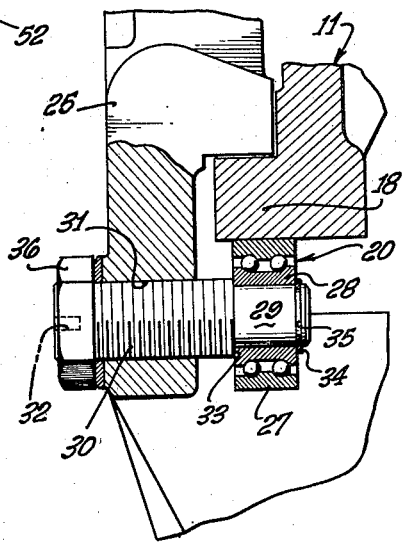
INVENTOR.
FRED G. BURG,
BY
Flam and Flam
ATTORNEYS.

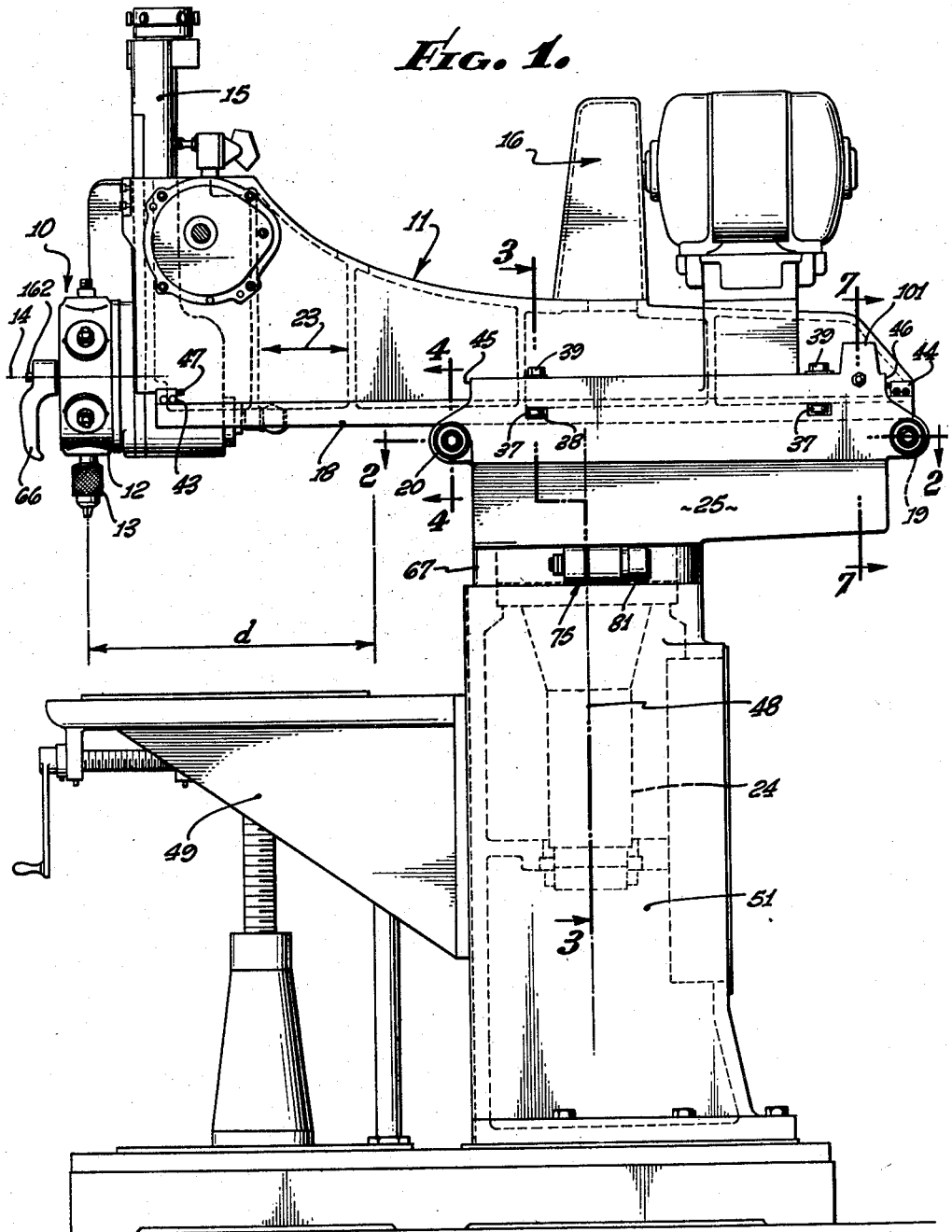

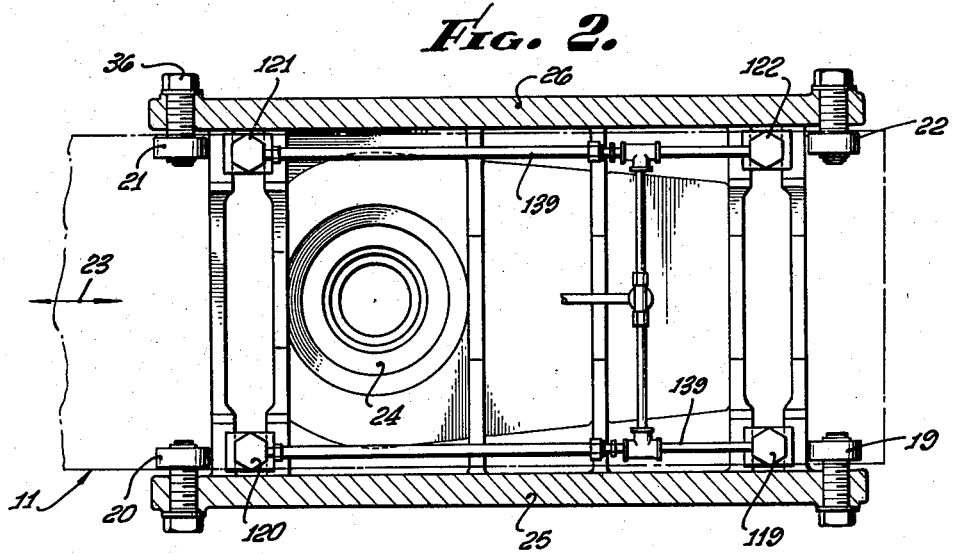
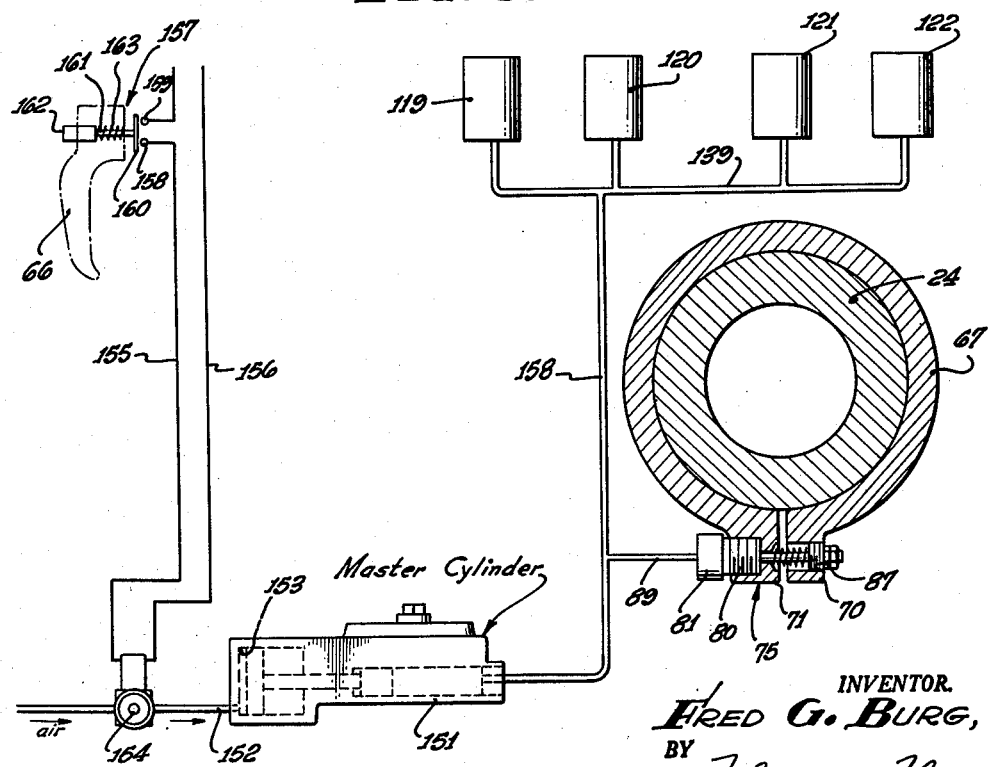

July 19, 1960 F. G. BURG 2,945,402
MOVABLE MOUNTING FOR MACHINE TOOL
Filed Nov. 4, 1957 4 Sheets-Sheet 4

INVENTOR.
FRED G. BURG,
BY Flam and Flam
ATTORNEYS.

United States Patent Office 2,945,402
Patented July 19, 1960

2,945,402

MOVABLE MOUNTING FOR MACHINE TOOL

Fred G. Burg, 4132 Don Ibarra Place,
Los Angeles 8, Calif.

Filed Nov. 4, 1957, Ser. No. 694,384

11 Claims. (Cl. 77—28)

This invention relates to machine tools.

The primary object of this invention is to provide a new, readily movable mounting for a machine tool that can be selectively locked in position.

Another object of this invention is to provide a mounting of this character capable of adequately supporting a heavy and complex tool structure, such as a multiple spindle drill and associated control equipment which determines speed, starting position, depth of cut and the like.

Another object of this invention is to provide a mounting of this character such that the machine tool, even though heavy, can be moved by hand to any position in a horizontal plane.

Another object of this invention is to provide simple adjustable guides for ensuring against binding despite substantial tolerances in manufacture of companion moving parts.

Another object of this invention is to provide a simple brake or lock mechanism for holding the machine tool in a fixed position.

It is another object of this invention to make it possible readily to adjust the position of a radial drill, both angularly and radially, and to lock the drill in any desired adjusted position.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention its best defined by the appended claims.

Referring to the drawings:

Figure 1 is a side elevation of a machine tool mounting incorporating the present invention;

Fig. 2 is an enlarged horizontal sectional view, taken along the plane indicated by line 2—2 of Fig. 1;

Fig. 3 is an enlarged fragmentary sectional view, taken on an offset plane indicated by line 3—3 of Fig. 1;

Fig. 4 is an enlarged fragmentary sectional view, taken along the plane indicated by line 4—4 of Fig. 1;

Fig. 9 is a diagram illustrating the hydraulic system.

Figure 5:
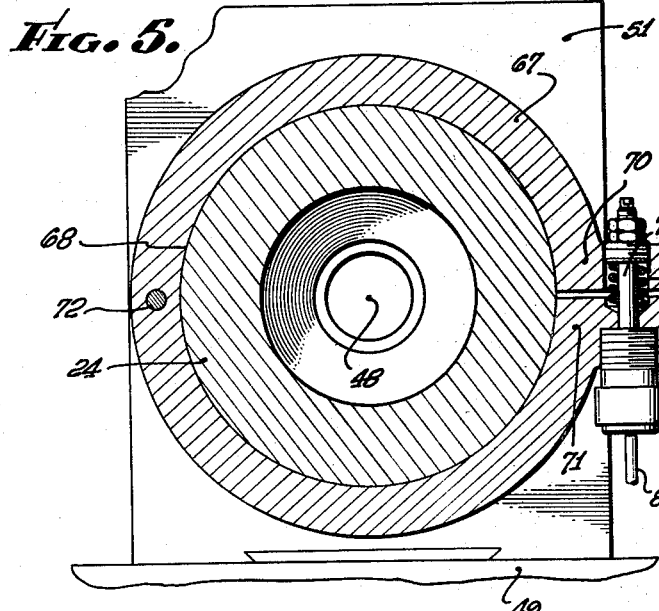
Fig. 5 is a sectional view, taken along the plane indicated by line 5—5 of Fig. 3.

In Fig. 1, there is illustrated a machine tool, in this instance a radial drill press provided with a multiple spindle drill 10, mounted at the forward end of a horizontally extending reinforced frame 11, conveniently formed as a casting.

A head 12, upon which is mounted a series of drill chucks 13 or the like, is mounted on the forward end of the frame 11 for angular movement about an axis 14. Any one of seven drills, reamers, taps or the like, carried by the chucks 13, can thus be operatively positioned. The head 12 is mounted upon a carriage 15 that is guided for vertical movement by the frame 11. A motor and transmission unit 16 for driving the chucks is mounted at the rear end of the frame 11.

Automatic or semi-automatic devices select in sequence predetermined chucks 13, starting position, vertical depth of cut, rate of cut, spindle speed and the like, such as in my prior Patents No. 2,670,636, issued March 2, 1954, and entitled "Machine Tool of the Drill Press Type Having Multiple Rotary Tools," and No. 2,795,307, issued June 11, 1957, and entitled "Cyclically Operable Power Transmission Mechanism."

As shown clearly in Fig. 3, opposite sides of the frame 11 have outwardly extending elongate bearing flanges 17 and 18, by the aid of which the frame 11 is supported. The bottom surfaces of these flanges 17 and 18 rest upon rollers 19, 20, 21 and 22 (Fig. 2). Two rollers 19 and 20 engage the lower surface of the flange 18 at spaced points; and the other rollers 21 and 22 engage correspondingly spaced points of the other flange 17. The axes of all of the rollers 19, 20, 21 and 22 are all horizontal and all parallel to each other. Accordingly, the entire frame 11 can be moved longitudinally in the direction illustrated by the double-headed arrow 23 in Figs. 1 and 2.

The rollers 19, 20, 21 and 22 are supported by a yoke formed integrally on the upper end of a vertical hollow shaft 24. Thus, as illustrated in Fig. 3, the yoke includes spaced, upwardly extending arms 25 and 26, forming a frame with two parallel sides for supporting the rollers.

The roller 20, which is like the remaining rollers, is illustrated in detail in Fig. 4. The roller 20, which takes the form of a thrust ballbearing structure having an outer race 27 and an inner race 28, is mounted on the inside of the arm 25. The inner race 28 is mounted on a reduced, slightly eccentric extension 29 of a horizontal post 30. The inner race 28 of the roller 20 is maintained against a shoulder 33 formed by the extension 29 by the aid of a snap ring 34 accommodated in an annular groove 35 near the end of the extension 29. The post 30 is threadedly accommodated in a transverse threaded aperture 31 of the arm 25, and one end of the post is accessible exteriorly of the arm 25. The lower portion of the frame 11, including the flanges 17 and 18, is received between the arms 24 and 25, and the flanges 17 and 18 rest upon the outer races of the rollers.

By virtue of the fact that the extension 29 is slightly eccentric to the axis of the post 30, angular movement of the post 30 causes the axis of the roller 20 to be shifted between vertical extremes. By adjusting the angular position of the post 30 and the posts for the other rollers as by operation of a tool inserted at a slot 32, the axes of all of the rollers 20, etc. can be brought into relationship such that they lie precisely in a common plane. This ensures appropriate movement of the frame 11 on the rollers 20, etc. A lock nut 36 for the post 30 secures it in an angularly adjusted position.

In order to prevent lateral shifting of the frame 11 in a direction along the axes of the supporting rollers 19, 20, 21 and 22, a series of guide rollers 37 are provided. Two of these guide rollers 37 cooperate with a vertical outer side surface of the flange 18, and a similar set of rollers cooperates with the vertical outer side surface of the flange 17. The rollers 37 are mounted upon the arms 25 and 26 for rotation about vertical axes normal to the axes of the supporting rollers 19, 20, 21 and 22. By the aid of these rollers, the frame 11 is confined for rectilinear movement relative to the spindle structure 24.

The guide rollers 37 (Fig. 3) are mounted at transverse openings 38 at those portions of the arms 25 and 26 opposite the side surfaces of the flanges 17 and 18. The rollers 37 take a form similar to the supporting rollers 19, 20, 21 and 22. They are ballbearing structures, having inner races eccentrically supported upon vertical posts 39. Non-circular heads of the posts 39 rest upon slight embossments 40 formed at the upper side of the arms 25 and 26. The posts project downwardly through threaded openings 41 into the transverse openings 38, at which the rollers 37 are mounted. By adjusting the angular positions of the posts 39, compensation is achieved for manufacturing tolerances, and the frame structure 11 moves in a precise course.

To limit longitudinal movement of the frame 11, abutments 43 and 44 (Fig. 1) are located at the ends of the frame flanges 17 and 18. These abutments 43 and 44 oppose end surfaces of the arms 25 and 26, as at 45 and 46. Spring cushions 47, carried in this instance by the movable abutments 43, ensure agains damage to the parts upon impact.

Figure 8:
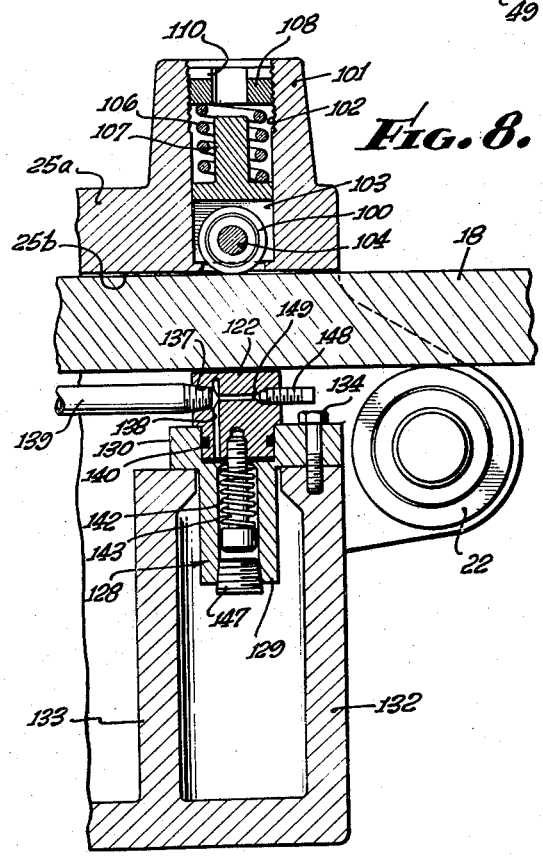
Fig. 8 is a sectional view similar to that shown in Fig. 7, but taken along a plane normal to the plane of Fig. 7.
Figure 7:
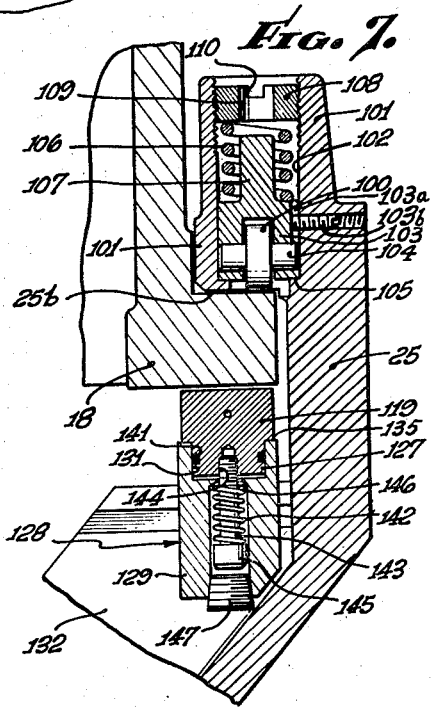
Fig. 7 is an enlarged fragmentary sectional view, taken along the plane indicated by line 7—7 of Fig. 1.

It is not unlikely that the center of gravity of the frame 11 and all parts carried thereby may be located near or even slightly forward of the two supporting rollers 20 and 21 when the frame is in the limited position illustrated in Fig. 1. To ensure stability, two pressure roller structures 100 are provided (Figs. 7 and 8). These pressure rollers 100, also in the form of roller bearing structures, bear down upon the upper surfaces of the frame flanges 17 and 18 at a place located near the rear supporting rollers 19 and 22.

The pressure rollers 100 are mounted at overhanging walls 25a and 26a of the arms 25 and 26 (see Figs. 1 and 3). The lower surfaces 25b and 26b of the walls 25a and 26a have only slight clearance with respect to the flanges 18 and 17.

As shown in Figs. 7 and 8, the roller 100 is supported between spaced arms of a yoke 103. A shaft 104, secured at opposite ends to the arms of the yoke 103, projects across the space between the arms and supports the roller 100 for rotation about its axis. The yoke 103 is vertically slidable in a bore 102 formed in the overhanging wall 25a and an embossment 101 formed thereon. An upwardly facing shoulder 105, formed at the lower end of the bore 102, limits downward movement of the yoke 103. In this position, a portion of the roller 100 projects beyond the lower surface 25b of the wall 25a and into contacting relationship with the upper surface of the flange 18. The yoke 103 is normally maintained against the shoulder 105 by the aid of a compression spring 106 which is accommodated in the bore 102, but the yoke may be moved upwardly for purposes to be described more fully hereinafter. A threaded pin 103b, carried by the embossment 101, has an end entering a longitudinally extending slot 103a on one side of the yoke 103 to maintain the axis of the roller 100 normal to the path of movement of the frame 11.

The spring 106 encompasses a stem 107 integrally formed on and projecting upwardly of the yoke 103. Its lower end bears against the area at the base of the stem 107; and its upper end abuts a plug 108 threadedly received in the upper end of the bore 102. The plug 108 has a non-circular bore 109 for insertion of an appropriate tool for rotation of the plug 108, whereby the force exerted by the spring 106 is adjusted. Furthermore, the plug 108 has a transverse slot 110 which may optionally be used for this purpose.

The structure thus described permits the tool head 12 carried by the frame 11 to move radially with respect to the axis 48 of the shaft 24 and throughout a range corresponding substantially to one dimension d of a work table 49 located beneath the head 12. In order to permit the tool head 12 to move in a direction transverse to the dimension d, the shaft 24 is mounted for angular movement about its axis 48.

The manner in which the shaft is supported is illustrated clearly in Fig. 3. The shaft 24 telescopes within a standard 51. A thrust roller bearing structure 52 has an inner race 53 accommodated on a first reduced portion 54 of the shaft 24. A downwardly facing shoulder 55 formed by the reduced portion 54 rests againsts the inner race 53. This race has a conical face. The conical outer race 56 of the bearing structure 52 rests upon an upwardly extending annular shoulder 57 formed interiorly of the hollow standard 51. Rolling elements 58 between the races transmit the thrust from the inner race 53 to the outer race 56 and thence to the standard 51.

The lower end of the shaft 24 is supported by a bearing structure 59 which maintains the shaft 24 against tilting. The inner race 60 of the bearing structure 59 is clamped by a nut 62 against a downwardly facing shoulder 61 formed near the lower end of the shaft 24. The outer race 63 of the bearing structure 59 is accommodated in an annular space bounded by a downwardly facing shoulder 64 formed centrally at a web or spider 65 of the standard 51.

The angular orientation of the frame 11 is adjusted by rotating the entire shaft structure 24 about its vertical axis 48, as provided by the bearing structures 52 and 59.

In order to move the frame 11, a handle 66 (Fig. 1) is provided. This handle is conveniently located adjacent the axis of the tool head 12.

In order to lock the frame 11 in position whereby inadvertent movement is prevent during actual machining processes, locking devices are provided. One of the locking devices prevents angular movement of the spindle 24 about its axis, and another locking device prevents longitudinal movement of the frame 11 relative to the arms 25—26. Figs. 3 and 5 illustrate the locking device for the shaft 24.

A clamping band 67 is disposed about an external cylindrical surface 68 of the shaft 24. The clamping band 67 rests upon the upper annular surface 69 of the standard 51, and the surface 68 with which the clamping band 67 coöperates is appropriately disposed above the end of the standard 51 for cooperation with the band 67.

As illustrated in Fig. 5, the band 67 has free ends 70 and 71 that may be moved toward and away from each other for holding the spindle 24 against movement relative to the band 67. In order that this relationship result in locking the spindle 24 against rotation, the band 67 is itself fixed against angular movement. For this purpose, a dowel pin 72, accommodated in a downwardly opening recess 73 (Fig. 3) at the intermediate portion of the band 67, also enters an upwardly opening recess 74 in the upper surface 69 of the standard 51.

Normally, the band 67 does not grip the surface 68.

For moving the band ends 70 and 71 toward each other, for the clamping function a hydraulic structure 75 (Figs. 5 and 6) is provided. This structure is mounted upon transverse or radial extensions 70a and 71a of the respective band ends 70 and 71. A piston rod 76 extends transversely of the radial extensions 70a and 71a. It passes with substantial clearance through a through bore 77 in the extension 70a and through a registering through bore 78 formed in the other radial extension 71a.

The end of the bore 78 in the extension 71a remote from the other band end 70 is enlarged and threaded, as at 79, for threadedly receiving a cylinder body 80. The cylinder body 80 has a flange 81 at its outer end which provides a cylinder space 82. The piston rod 77 extends through the body and into the cylinder space 82 via a bore 83 provided in the cylinder body 80. A piston 84 is formed at the end of the piston rod 76 and it works appropriately within the cylinder space 82.

The upper end of the piston rod 76, as viewed in

Figure 6:
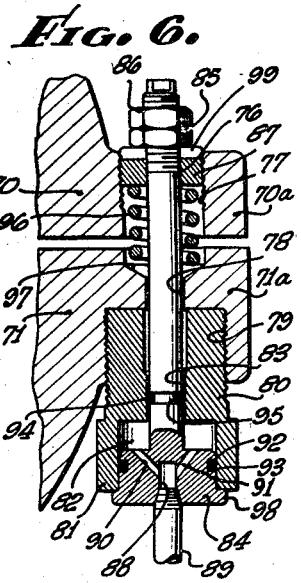
Fig. 6 is an enlarged detail sectional view of a part of the apparatus illustrated in Fig. 5.

Fig. 6, carries an abutment in the form of a nut 85. This nut 85, locked in position by a lock nut 86, engages a threaded reaction plug 87 mounted within the bore 77 of the band end 70. As pressure is applied to the cylinder space 82, the piston 84 is urged downwardly of the cylinder body 80 until the abutment 85 engages the reaction plug 87. The piston 84 is prevented from further movement by the abutment 85. Accordingly, the cylinder body 80 itself is then moved in the opposite direction corresponding to movement of the band end 71 toward the band end 70. Thus, by application of fluid pressure to the space 82, the band 67 clamps about the spindle 24 and it is appropriately locked in position.

Pressure is admitted into the cylinder space 82 through the piston 84. For this purpose, the piston 84 has an outwardly extending threaded opening 88 in which a fluid line 89 is inserted. Branch passages 90 and 91, opening on opposite sides of the stem 85, provide appropriate communication from the passage 88 to the inner side of the piston 84.

The piston 84 carries an O-ring 92 accommodated in an annular groove 93 in order to prevent leakage of fluid between the cylinder body 80 and the piston 84. An O-ring 94, accommodated in an annular groove 95 on the stem or rod 76, prevents passage of fluid through the body bore 83 in the opposite direction.

A compression spring 96 urges the band ends 70 and 71 apart when pressure in the cylinder space 82 is released. The spring 96 is accommodated in the bore 77 in encompassing relationship with respect to the piston rod 76. One end of the spring 96 is seated in a conical enlargement 97 of the bore 78 at the inner side of the extension 71a. The other end of the spring 96 engages the inner side of the reaction plug 87.

The force exerted by the spring 96 may be adjusted by movement of the reaction plug 87. A slot 99 in the outer end of the reaction plug 87 serves as a means whereby the position of the reaction plug 87 may readily be adjusted.

A flange 98, formed on piston 84, cooperates with the abutment nut 85 at the other end of the rod 85 to limit separating movement of the band ends 70 and 71. The flange 98 engages the end surface of the cylinder body flange 81.

The position of the abutment nut 85 along the threaded end of the piston rod 76 determines the limit of separating movement of the band ends 70 and 71.

Another locking device normally prevents horizontal translation of the frame 11. Four hydraulic lift structures 119, 120, 121 and 122 (Fig. 2) are engageable with the lower surfaces of the flanges 17 and 18 and lift them from the rollers 19, 20, 21 and 22. The lifts clamp the upper surfaces of the flanges 17 and 18 against the lower surfaces 25b and 26b of the overhanging walls 25a and 26a (see also Fig. 3). The slidable suspension of the pressure rollers 100 (Fig. 7 and 8) permits this slight vertical shifting movement of the frame 11.

The hydraulic lift structures 119, 120, 121 and 122 are in the form of pistons. Thus, as shown in Figs. 7 and 8, the lift piston 119 has a lower circular reduced extension 127 slidable in a cylinder provided by a body block 128 supported within the arm 25.

The block 128 includes a stem 129 and a flange 130 within which an upwardly opening cylinder recess 131 is formed. The flange 130 rests upon upper surfaces of spaced ribs 132 and 133 formed integrally with the arm 25, and it is secured against movement by the aid of one or more cap screws 134 (Fig. 8). The stem 129 enters between the ribs 132 and 133.

The circular reduced extension 127 slides within the cylinder recess 131, and a shoulder 135 formed by the reduced extension 127 of the piston 119 normally rests upon the edges of the flange 130 which surround the outer end of the recess 131. In this position, the upper surface 136 of the lift or piston 119 is located beneath the upper reach of the adjacent supporting roller 19, and the flange 18 accordingly rests upon the supporting roller 19.

For moving the lift or piston 119 upwardly, the space beneath the piston in the cylindrical recess 131 is capable of being pressurized. For this purpose, fluid under pressure is admitted to the space beneath the piston 119 through passageways formed at the piston itself. A horizontal passage 137 formed in the upper portion of the piston 119 intersects a vertical passage 138 in the piston 119. The lower edge of the passage 138 opens at the lower surface of the piston 119 that is exposed in the recess 131. A hydraulic line or conduit 139 connects with the enlarged end of the passage 137 and conducts fluid under pressure to the cylinder space. A needle valve 148, threadedly mounted at the opposite end of the horizontal passage 137, provides a slight bleed opening, whereby entrapped air can be removed, for example when fluid is first placed in the system. The valve 148 cooperates with a conical seat 149 formed near the outer end of the passage 137.

An O-ring 140, accommodated in a groove 141 in the reduced portion of the piston 119, prevents leakage upwardly between the body 128 and piston 119.

A compression spring 142 urges the piston 119 downwardly when fluid pressure is released. The spring 142 extends about a removable stud 143 projecting from the lower end of the piston 119. The stud 143 enters a bore 144 formed in the stem portion 129 of the block 128. The lower end of the spring 142 bears against the head 145 of the stud 143, and its upper end engages a shoulder 146 formed by a reduction at the upper end of the passage 144. The spring 142 and stud 143 are placed in assembled relationship with respect to the piston 119 by manipulations at the lower end of the bore or opening 144 after the piston 119 is inserted in the upper end of the body 128. A plug 147 closes the lower end of the bore 144 and appropriately prevents leakage of fluid from the cylinder space outwardly of the plug through the bore 144.

The lifts 119, 120, 121 and 122, as well as the piston structure 84 for the band 67, are simultaneously supplied with fluid under pressure from a master cylinder structure 151 (Fig. 9). Air pressure actuates the master cylinder structure 151 so that fluid pressure is normally applied to all of the piston structures, whereby the frame 11 is normally locked. A flexible branch conduit 158, extending upwardly from the bottom of the shaft 24 (see Fig. 3), leads to the lifts 119, etc. located between the arms 25 and 26. The branch conduit 158 as well as the branch conduit 89 (Fig. 6) connect with the pressure outlet of the master cylinder.

An air conduit 152 is illustrated in Fig. 9 leading to the master cylinder head 153. A normally open electromagnetic valve 154 is interposed in the air conduit 152 for control thereof. In order to release hydraulic pressure, the air valve 154 is closed. For this purpose, a circuit, including lines 155 and 156 for the electromagnetic valve 154, is closed by a manually operable switch structure 157. The switch structure 157 includes contacts 158 and 159 that are bridged by a contact disk or arm 160 secured to a plunger 161. A button 162 for operating the plunger 161 projects through the handle 66 located adjacent the tool head 12.

The plunger 161 is biased by a spring 163 so that the blade 160 is normally out of engagement with the contacts 158 and 159. Accordingly, the switch structure 157 is normally open.

In order to move the frame 11 and thus the tool head 12 to any desired position, the operator grasps the handle 66 and depresses the button 162 with his thumb. The electromagnetic valve 154 is then energized and the supply of air to the master cylinder structure 151 is interrupted. Accordingly, hydraulic pressure to the piston structures is released and the tool can readily be moved. When the desired position is achieved, the operator releases the button 162.

The inventor claims:

1. In a machine tool structure: a support forming a rectilinear guide; a tool member received in said guide for rectilinear movement therein; said guide including a pair of opposed surfaces between which the member is movable; one of said surfaces being plane; and means for clamping the tool member against movement, including means for urging the tool member toward said plane surface.

2. In a machine tool structure: a support forming a rectilinear guide; a tool member received in said guide for rectilinear movement therein; said guide including a pair of opposed surfaces, one of which is plane, and between which surfaces the member is movable; hydraulic means for urging the tool member toward the plane surface; a standard for mounting the support for angular adjustment; and hydraulically operated means carried by the standard for restraining the support against angular movement.

3. In a machine tool having a support capable of angular adjustment about an axis; a tool member capable of radial adjustment with respect to said axis; the combination therewith of a pair of clamping means, respectively for restraining angular movement of the support, and for restraining radial movement of the member; and a common control mechanism carried by the member for both said clamping means.

4. In apparatus for supporting a machine tool or the like: an elongate frame member adapted to support a machine tool; a support member; a plurality of supporting rollers carried by one of the members and engageable with the other of the members for supporting the frame member for longitudinal movement; surface forming means provided by said support member overlying a portion of the frame member and out of the path of longitudinal movement of the frame member when the rollers are engaged; and selectively operable means for lifting the frame member and clamping it against said surface forming means for restraining the frame member against movement with respect to said support member.

5. In apparatus for supporting a machine tool or the like: an elongate frame member adapted to support a machine tool; a support member; a plurality of supporting rollers carried by one of the members and engageable with the other of the members for supporting the frame member for longitudinal movement; surface forming means provided by said support member overlying a portion of the frame member and out of the path of longitudinal movement of the frame member when the rollers are engaged; selectively operable means for lifting the frame member and clamping it against said surface forming means for restraining the frame member against movement with respect to said support member; means mounting the support member for angular movement about an axis transverse to the direction of longitudinal movement of said frame member; selectively operable means for restraining said support member against angular movement; and digitally engageable means mounted by said frame member and operable to release both said selectively operable means; said selectively operable means being normally active to restrain movement of the frame member.

6. The combination as set forth in claim 5 in which: both of said selectively operable means are operated on the application of hydraulic pressure; a normally open electromagnetically operable valve causes hydraulic pressure to be applied to said selectively operable means to render them active; and said digitally engageable means comprises a normally open switch for controlling the energization of said electromagnetically operable valve.

7. In apparatus for supporting a machine tool or the like: an elongate frame member adapted to support a machine tool; a support member; a plurality of supporting rollers carried by one of the members and engageable with the other of the members for supporting the frame member for longitudinal movement; a pair of rollers carried by one of said members and spring-pressed into engagement with the other of the members to prevent the weight of said frame member from tilting the frame member about some of the supporting rollers as fulcrum points.

8. In a machine tool structure: a standard; a shaft mounted for angular movement within the standard and projecting upwardly beyond the standard; a band extending about the shaft and having ends movable toward each other; means restraining angular movement of the band relative to the standard; means forming a cylinder on one of the band ends and facing away from the other band end; a piston in said cylinder and having a rod extending through the other band end; companion means provided by the piston and the rod for limiting separating movement of the band ends; and means for admitting fluid under pressure into said space for causing the band ends to move toward each other.

9. In a machine tool structure: a standard; a shaft mounted for angular movement within the standard and projecting upwardly beyond the standard; a band extending about the shaft and having ends movable toward each other; means restraining angular movement of the band relative to the standard; means forming a cylinder on one of the band ends and facing away from the other band end; a piston in said cylinder and having a rod extending through the other band end; a compression spring engaging said one of the band ends; means forming an opening in said other band end for said rod and said spring; adjustable means carried at said opening for transferring the force of said spring to said other band end and for adjusting the force exerted by said spring; an adjustable abutment carried by said rod and engageable with said adjustable means; means provided by said piston for engagement with said cylinder, and cooperable with said adjustable abutment means for limiting separating movement of said band ends; and means for admitting fluid under pressure into said space.

10. In a machine tool: a support forming a rectilinear guide; a frame movable in the guide; a plurality of means for lifting the frame from said guide, each comprising: a cylinder carried by the support, a piston movable in the cylinder, and engageable with the frame, means for admitting fluid under pressure into said cylinder, and means for positioning the piston out of the path of movement of the frame when the fluid pressure is released; and means against which the frame is clamped when said lifting means are operative.

11. In a machine tool: a support forming a rectilinear guide; a frame movable in the guide; a plurality of means for lifting the frame from said guide, each comprising: a cylinder carried by the support, a piston movable in the cylinder, and engageable with the frame, means for admitting fluid under pressure into said cylinder, means providing a bleed hole from said cylinder space, and means for positioning the piston out of the path of movement of the frame when the fluid pressure is released; and means against which the frame is clamped when said lifting means are operative.

References Cited in the file of this patent

UNITED STATES PATENTS

| | | |
|---|---|---|
| 2,174,018 | Schaum | Sept. 26, 1939 |
| 2,318,851 | Griffith | May 11, 1943 |
| 2,500,321 | Petersen | Mar. 14, 1950 |
| 2,711,802 | Davis | June 28, 1955 |
| 2,759,502 | Auchincloss | Aug. 21, 1956 |

FOREIGN PATENTS

| | | |
|---|---|---|
| 891,783 | Germany | Oct. 1, 1953 |